US012660874B1

(12) United States Patent
Wang

(10) Patent No.: US 12,660,874 B1
(45) Date of Patent: Jun. 23, 2026

(54) BRANCH-SHAPED LIGHT STRING AND LIGHT-EMITTING BONSAI

(71) Applicant: Huizhou Zhongchuanmei Cultural and Creative Co., Ltd, Huizhou (CN)

(72) Inventor: Jiehua Wang, Huizhou (CN)

(73) Assignee: Huizhou Zhongchuanmei Cultural and Creative Co., Ltd, Huizhou (CN)

( * ) Notice: Subject to any disclaimer, the term of this patent is extended or adjusted under 35 U.S.C. 154(b) by 0 days.

(21) Appl. No.: 19/243,330

(22) Filed: Jun. 19, 2025

(30) Foreign Application Priority Data

May 28, 2025 (CN) ......................... 202521077044.4

(51) Int. Cl.
*A41G 1/00* (2006.01)
*F21V 23/00* (2015.01)

(52) U.S. Cl.
CPC ............. *A41G 1/005* (2013.01); *A41G 1/007* (2013.01); *F21V 23/001* (2013.01)

(58) Field of Classification Search
CPC ........ A41G 1/005; A41G 1/007; F21V 23/001
See application file for complete search history.

(56) References Cited

U.S. PATENT DOCUMENTS 4,777,571 A * 10/1988 Morgan .................. F21S 6/001 362/568
5,043,193 A * 8/1991 Ueda ........................ A41G 1/00 428/690
6,457,839 B1 * 10/2002 Grandoit ................ A47G 33/06 362/122
6,752,512 B2 * 6/2004 Pan ........................... F21S 4/10 362/227
7,896,516 B1 * 3/2011 Zhu ........................... F21S 4/10 362/249.06
10,187,962 B1 * 1/2019 Tu .......................... A47G 7/041
11,592,149 B1 * 2/2023 Cushing ................. A47G 33/06
11,788,713 B2 10/2023 Huang et al.
2009/0084032 A1 4/2009 Beeman
2011/0096546 A1 * 4/2011 Weiser ................... A41G 1/005 362/249.18
2014/0287618 A1 * 9/2014 Chen .......................... F21S 4/10 439/527
2014/0321152 A1 10/2014 Cayton
2015/0315806 A1 11/2015 Heard
2023/0137955 A1 * 5/2023 Falk ....................... A47G 33/06 428/18

* cited by examiner

*Primary Examiner* — Bryon T Gyllstrom

(57) ABSTRACT

A branch-shaped light string includes a main branch, at least one decorative branch, and at least one light-emitting branch. The at least one decorative branch is arranged on the main branch, and the at least one light-emitting branch is arranged on the main branch and extends in a direction away from the main branch, and/or is arranged on the decorative branch and extends in a direction away from the decorative branch. Each light-emitting branch includes at least one light source, and each light source is configured to be electrically connected with an external power source. The light-emitting bonsai includes the branch-shaped light string.

13 Claims, 4 Drawing Sheets

BRANCH-SHAPED LIGHT STRING AND LIGHT-EMITTING BONSAI

CROSS REFERENCE TO RELATED APPLICATIONS

This application claims priority benefits to Chinese Patent Application No. 2025210770444, filed on May 28, 2025, the contents of which are incorporated herein by reference.

TECHNICAL FIELD

The present disclosure relates to the technical field of lamp decorations, and in particular, to a branch-shaped light string and a light-emitting bonsai.

BACKGROUND

Bonsai refers to plants like flowers cultivated in potted form. With the rapid pace of modern society, users increasingly prefer artificial plants requiring no daily care or maintenance as decorative accents in daily life, rather than maintaining real plant bonsai.

However, standalone artificial plants offer limited functionality, offering only ornamental value without other practical utility.

Therefore, from a practical perspective, providing plant bonsai that offers both ornamental value and practical benefits to the users would significantly enhance the ambiance of the living space of the users.

SUMMARY

An objective of the present disclosure is to provide a branch-shaped light string and a light-emitting bonsai, which not only has the ornamental appearance of a plant but also serves a lighting function, thereby helping to adjust the ambient atmosphere.

In order to achieve the above objective, the present disclosure provides the following technical solutions.

A first aspect of the present disclosure provides a branch-shaped light string. The branch-shaped light string includes: a main branch, at least one decorative branch, and at least one light-emitting branch. The main branch extends in a preset direction, the at least one decorative branch is arranged on the main branch and extends in a direction away from the main branch, and the at least one light-emitting branch is arranged on the main branch and extends in a direction away from the main branch, and/or is arranged on the decorative branch and extends in a direction away from the decorative branch. Each light-emitting branch includes at least one light source, and each light source is configured to be electrically connected with an external power source.

In some implementation solutions of the branch-shaped light string provided in the first aspect of the present disclosure, each light-emitting branch further includes: at least one light-transmitting member and at least one set of wires. A first hole channel is formed in and extends through each light-transmitting member, and at least one light source is arranged in each first hole channel. Each set of wires at least include a positive wire and a negative wire, where the positive wire and the negative wire are respectively threaded into the first hole channel through two ends of the first hole channel, and are electrically connected with the light source in the first hole channel.

In some implementation solutions of the branch-shaped light string provided in the first aspect of the present disclosure, the light-emitting branch further includes: a decorative coating, wrapping portions of each set of wires exposed outside the light-transmitting member.

In some implementation solutions of the branch-shaped light string provided in the first aspect of the present disclosure, the light-transmitting member is made of a transparent or translucent material.

A second aspect of the present disclosure proposes a light-emitting bonsai. The light-emitting bonsai includes: the branch-shaped light string provided in any of items in the first aspect of the present disclosure, a container, an insertion core cylinder, and a cover. The container is internally provided with an accommodation space and has an opening in one side. The insertion core cylinder is arranged in the accommodation space through the opening and internally provided with an installation space. The cover is arranged at the opening to cover the accommodation space and the installation space, an insertion hole is formed in the cover, the installation space communicates with an exterior of the container through the insertion hole, a limiting ring is sleeved onto the insertion hole, a second hole channel communicating with the installation space is formed in the limiting ring, and the main branch of the branch-shaped light string passes through the second hole channel and extends into the installation space.

In some implementation solutions of the light-emitting bonsai provided in the second aspect of the present disclosure, the light-emitting bonsai further includes an integrated circuit board and a battery. The integrated circuit board is arranged in the installation space, and the battery is arranged in the installation space and electrically connected with the integrated circuit board. A light source switch is arranged on a side portion of the container and is electrically connected with the battery through the integrated circuit board, and the wires of the branch-shaped light string are electrically connected with the battery through the light source switch.

In some implementation solutions of the light-emitting bonsai provided in the second aspect of the present disclosure, a charging interface is further formed in the cover and is electrically connected with the battery through the integrated circuit board.

Analysis reveals that the present disclosure discloses the branch-shaped light string and the light-emitting bonsai. The branch-shaped light string and the light-emitting bonsai not only imitate the ornamental appearance of plants, but also serve a lighting function. When using the branch-shaped light string and the light-emitting bonsai disclosed in the present disclosure, users can adjust the atmosphere of their environment through the lighting functions of the branch-shaped light string and the light-emitting bonsai, providing a comfortable and pleasant user experience.

BRIEF DESCRIPTION OF THE DRAWINGS

The accompanying drawings of the specification constituting a part of this application are used to provide a further understanding of the present disclosure. The exemplary embodiments of the present disclosure and descriptions thereof are used to explain the present disclosure, and do not constitute an improper limitation on the present disclosure.

Figure 1:
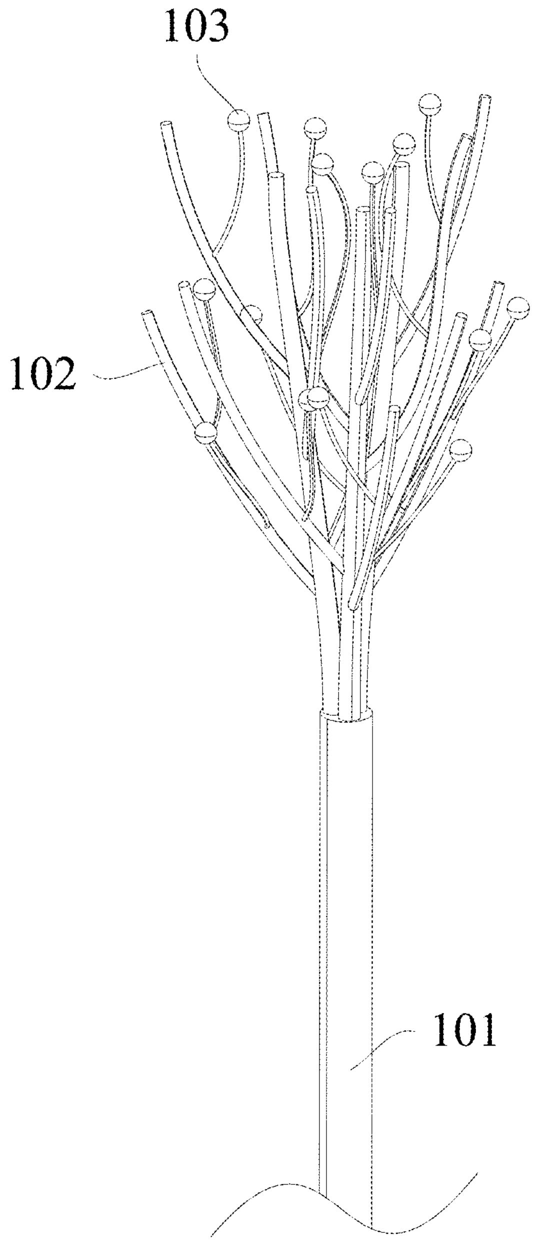
FIG. 1 is a perspective view of a branch-shaped light string according to Embodiment 1 of the present disclosure.

Descriptions of reference numerals: 1—branch-shaped light string; 101—main branch; 102—decorative branch; 103—light-emitting branch; 103*a*—wire; 103*b*—light source; 103*c*—decorative coating; 103*d*—light-transmitting member; 103*e*—first hole channel; 103*f*—decorative sheet; 2—container; 201—accommodation space; 202—light source switch; 3—cover; 301—insertion hole; 302—limiting ring; 302*a*—second hole channel; 303—charging interface; 4—insertion core cylinder; 401—installation space; 5—battery; and 6—integrated circuit board.

DETAILED DESCRIPTION OF THE EMBODIMENTS

The present disclosure is described in detail with reference to the accompanying drawings and in conjunction with the embodiments as below. Each example is provided by way of explanation of the present disclosure and is not intended to limit the present disclosure. In fact, those skilled in the art should understand that modifications and variations may be made to the present disclosure without departing from the scope or spirit of the present disclosure. For example, features illustrated or described as part of one embodiment may be used in another embodiment to yield yet a further embodiment. Therefore, it is intended that the present disclosure includes such modifications and variations that fall within the scope of the appended claims and equivalents thereof.

In the description of the present disclosure, terms such as "longitudinal," "transverse," "upper," "lower," "front," "rear," "left," "right," "vertical," "horizontal," "top," and "bottom" indicate orientational or positional relationships based on those shown in the accompanying drawings, are used merely for convenience in describing the present disclosure, and do not require the present disclosure to be constructed and operated in a specific orientation, and thus should not be construed as limiting the present disclosure. The terms "connection," "connecting," and "arranged" as used in the disclose should be understood in a broad sense. For example, connection may refer to a fixed connection, or a detachable connection; it may refer to a direct connection or an indirect connection through an intermediate component; or it may refer to a wired electrical connection, a wireless electrical connection, or a wireless communication signal connection. Those of ordinary skill in the art may understand specific meanings of the above terms according to specific situations.

One or more examples of the present disclosure are illustrated in the accompanying drawings. The detailed description uses numerical and alphabetical labels to refer to the features in the accompanying drawings. Similar or analogous labels in the accompanying drawings and descriptions have been used to refer to similar or analogous parts of the present disclosure. As used herein, the terms "first," "second," "third", etc., are interchangeably used to distinguish one component from another and are not intended to indicate the position or importance of individual components.

Embodiment 1

Figure 2:
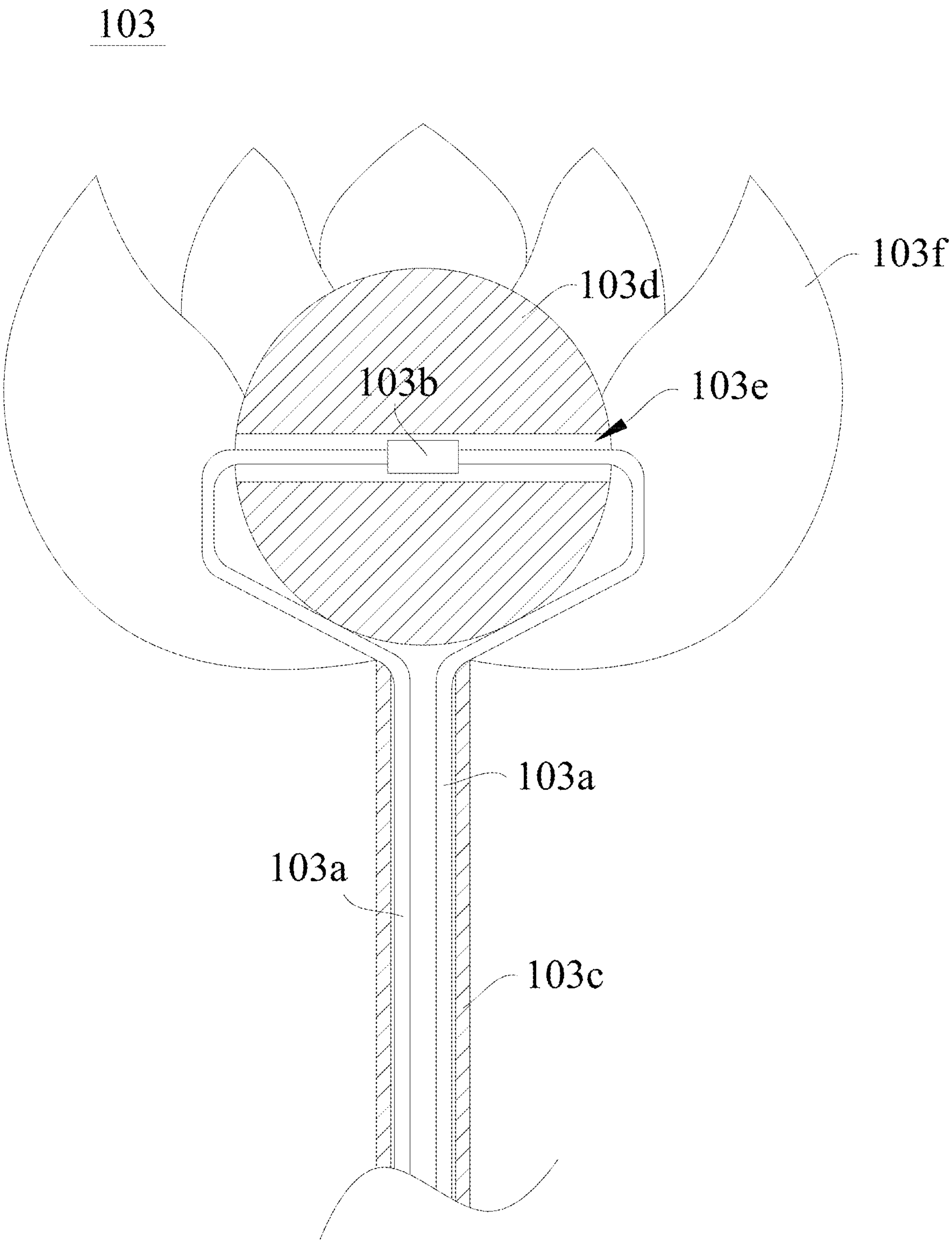
FIG. 2 is a perspective view of a light-emitting branch in the branch-shaped light string according to Embodiment 1 of the present disclosure.

As shown in FIG. 1 to FIG. 2, according to Embodiment 1 of the present disclosure, a branch-shaped light string 1 is provided. The branch-shaped light string 1 includes: a main branch 101, a plurality of decorative branches 102, and a plurality of light-emitting branches 103.

Specifically, the plurality of decorative branches 102 extending in different directions are arranged on the extending main branch 101, and at least one light-emitting branch 103 extending in a preset direction is arranged on part of decorative branches 102. A light-transmitting member 103*d* is arranged at a tail end of each light-emitting branch 103, and a first hole channel 103*e* is formed in and extends through the light-emitting branch 103. A light-emitting diode (LED) serving as a light source 103*b* is arranged in the first hole channel 103*e*, and a positive electrode and a negative electrode of the LED are electrically connected with wires 103*a* respectively. The wires 103*a* extend from the positive electrode and the negative electrode of the LED to an exterior of the light-transmitting member 103*d* through the first hole channel 103*e* and jointly support the light-transmitting member 103*d*. Portions of the wires 103*a* located outside the light-transmitting member 103*d* are covered with a decorative coating 103*c*.

In some embodiments, the main branch 101 and the decorative branches 102 may use materials such as copper wires or iron wires as a supporting structure. The copper wires or the iron wires have good plasticity and supporting rigidity, allowing users to freely adjust a distribution mode and an extension direction of the main branch 101 and the decorative branches 102 according to their aesthetic needs or placement requirements.

In some embodiments, the main branch 101 and the decorative branches 102 may use real plant branch specimens to further enhance the ornamental appearance of the branch-shaped light string 1.

In some embodiments, the wires 103*a* may be enameled copper wires, which not only provides good electrical conductivity, but also possess good plasticity and supporting rigidity to meet supporting requirements for the light-transmitting member 103*d*.

In some embodiments, the light-transmitting member 103*d* may be of a spherical structure, allowing the light-transmitting member 103*d* to imitate flower stamens and/or fruits.

In some embodiments, a plurality of decorative sheets 103*f* may be arranged at peripheral sides of the light-transmitting members 103*d*, the main branch 101, the decorative branches 102, and/or the light-emitting branches 103. The decorative sheets 103*f* may be made of organic polymer materials or fiber materials, allowing the decorative sheets 103*f* to imitate petals and/or leaves.

In some embodiments, the light source 103*b* uses a white LED, and the light-transmitting member 103*d* is made of a colorless or white transparent or translucent material, enabling the branch-shaped light string 1 to emit white light.

In some embodiments, the light source 103*b* uses a white LED, and the light-transmitting member 103*d* is made of a colored transparent or translucent material, enabling the branch-shaped light string 1 to emit colored light.

In some embodiments, the light source 103*b* uses a colored LED, and the light-transmitting member 103*d* is made of a colorless or white transparent or translucent material, enabling the branch-shaped light string 1 to emit colored light.

In some embodiments, the decorative coating 103*c* may be made of a strip-shaped organic polymer or fiber material, and is wound in layers around portions of each set of wires 103*a* exposed outside the light-transmitting member 103*d*.

In some embodiments, the decorative coating 103*c* may be made of a tubular organic polymer or fiber material, and is sleeved onto portions of each set of wires 103*a* exposed outside the light-transmitting member 103*d*.

In some embodiments, the decorative coating 103*c* may be a paint coating formed by a spraying process, and is sprayed onto portions of each set of wires 103*a* exposed outside the light-transmitting member 103*d*.

In some embodiments, the decorative coating 103*c* may also be used to cover the main branch 101 and/or the decorative branches 102 of the branch-shaped light string 1.

In some embodiments, an outer side surface of the decorative coating 103*c* may be provided with surface textures that imitate plant branches, making the appearance of the branch-shaped light string 1 more closely resemble real plants.

Embodiment 2

Figure 3:
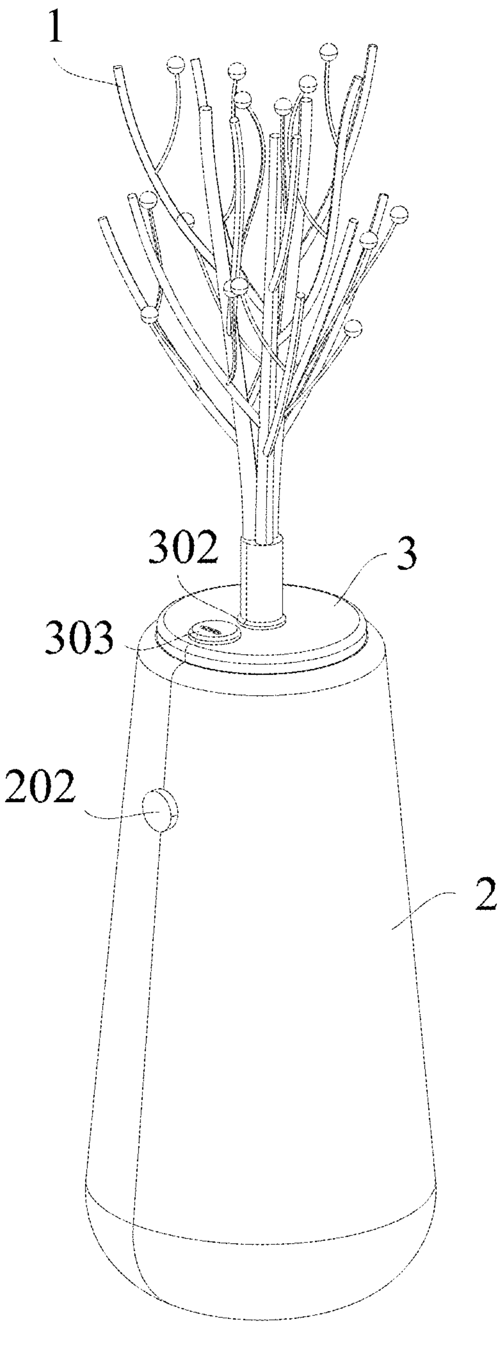
FIG. 3 is a perspective view of a light-emitting bonsai according to Embodiment 2 of the present disclosure.
Figure 4:
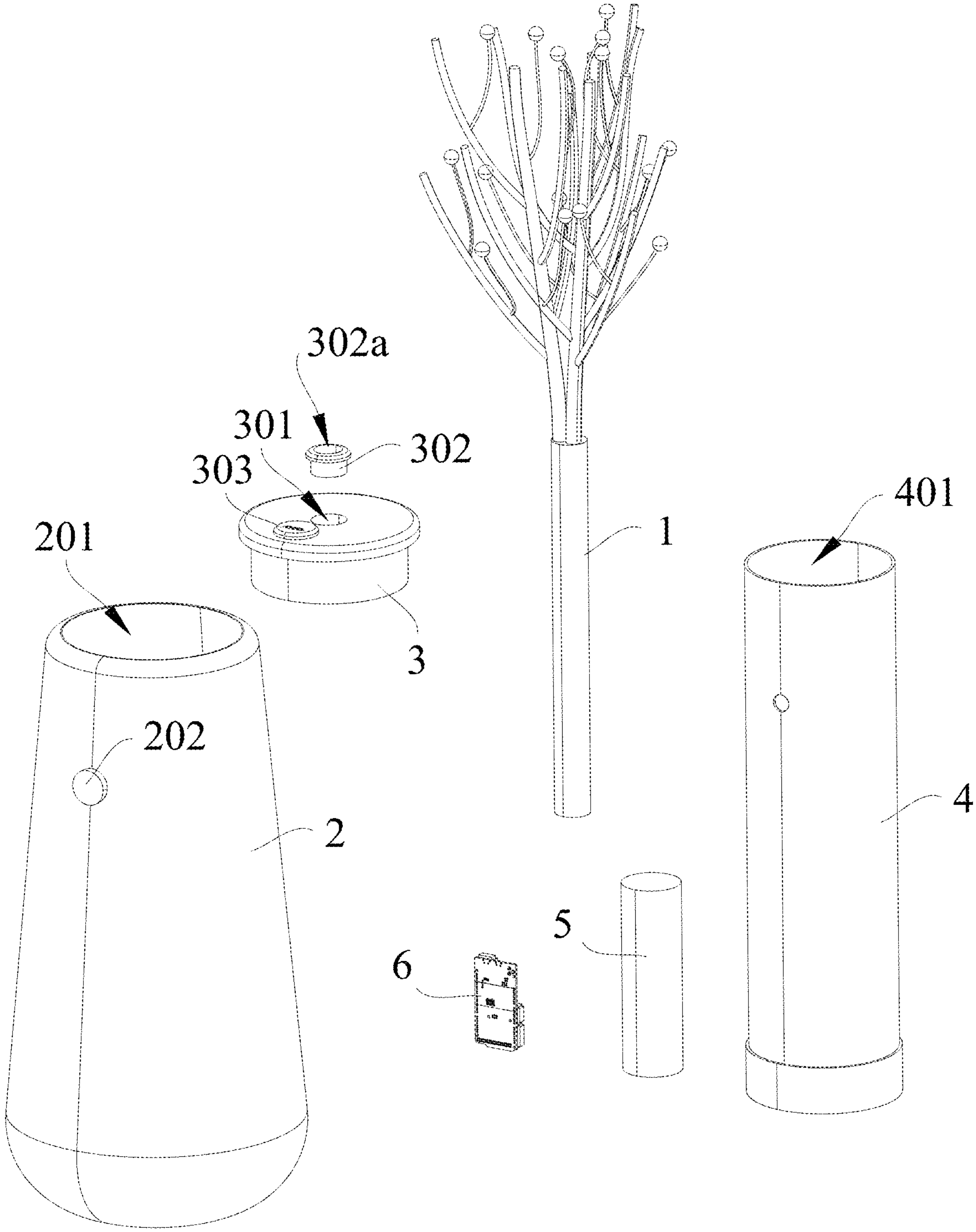
FIG. 4 is a partial exploded perspective view of the light-emitting bonsai according to Embodiment 2 of the present disclosure.

As shown in FIG. 3 to FIG. 4, according to Embodiment 2 of the present disclosure, a light-emitting bonsai is also provided. The light-emitting bonsai includes: the above branch-shaped light string 1 provided in Embodiment 1 of the present disclosure, a container 2, an insertion core cylinder 4, a cover 3, a battery 5, and an integrated circuit board 6.

Specifically, the container 2 is internally provided with an accommodation space 201 and has an opening in one side, and the insertion core cylinder 4 may be inserted into the accommodation space 201 of the container 2 through the opening. The insertion core cylinder 4 is internally provided with an installation space 401 for installing the integrated circuit board 6 and the battery 5, and the battery 5 and the integrated circuit board 6 are electrically connected. The cover 3 is arranged at the opening of the container 2 to seal the accommodation space 201 and the installation space 401. A charging interface 303 electrically connected to the battery 5 through the integrated circuit board 6 is formed in the cover 3. A user may charge the battery 5 or directly power the light-emitting bonsai through the charging interface 303. An insertion hole 301 that extends through the cover 3 and communicates with the installation space 401 of the insertion core cylinder 4 is formed in the center of the cover 3, and a limiting ring 302 is inserted into the insertion hole 301. A second hole channel 302*a* is formed in and extends through the limiting ring 302. The main branch 101 of the branch-shaped light string 1 may be inserted into the installation space 401 of the insertion core cylinder 4 through the second hole channel 302*a*, allowing the wires 103*a* on the branch-shaped light string 1 to be electrically connected to the battery 5 through the integrated circuit board 6 in the installation space 401. A light source switch 202 is also arranged on a side portion of the container 2. The light source switch 202 is electrically connected to the battery 5 and the wires 103*a* of the branch-shaped light string 1 through the integrated circuit board 6, enabling the user to control the light source 103*b* of the branch-shaped light string 1 through the light source switch 202.

In some embodiments, the diameter of the second hole channel 302*a* formed in the limiting ring 302 is slightly smaller than the branch size of the main branch 101 of the branch-shaped light string 1 to ensure an interference fit between the main branch 101 and the second hole channel 302*a*, thereby achieving the purpose of limiting the branch-shaped light string 1 through the limiting ring 302. The limiting ring 302 may be made of a material with good waterproof performance to enhance the sealing performance at the second hole channel 302*a*.

In some embodiments, the container 2 may be a vase or flowerpot made of ceramic or other similar materials to enhance the ornamental appearance of the light-emitting bonsai.

In some embodiments, a surface of one side of the cover 3 away from the accommodation space 201 may be covered with a film or ethylene vinyl acetate copolymer (EVA) plastic sheet to enhance the waterproof performance of the container 2. This design makes it easier for the user to clean and further enhance the ornamental appearance of a product.

In some embodiments, the light source switch 202 may be a push-button switch, a knob switch, or a touch switch. The appearance of the light source switch 202 may be designed with an attractive pattern, such as a product or brand logo.

In some embodiments, the charging interface 303 may be a USB Type-C (a standard interface shape) interface to adapt to mobile phone charging cables and chargers, thereby facilitating the user to charge the light-emitting bonsai.

In some embodiments, the light source switch 202 may be configured to control an on/off state, brightness, a flashing frequency, or a color of the light source in the branch-shaped light string 1 through the integrated circuit board 6.

In some embodiments, the light source 103*b* in the branch-shaped light string 1 may change color or flashing frequency through the integrated circuit board 6, providing feedback to the user about a charge level of the battery 5.

In some embodiments, when the user charges the battery 5 through the charging interface 303, the light-emitting bonsai may change the color or the flashing frequency of the light source 103*b* on the branch-shaped light string 1 through the integrated circuit board 6, providing feedback to the user about a charging condition.

In some embodiments, the user may set a timer for turning the light source 103*b* in the branch-shaped light string 1 on and off through the integrated circuit board 6.

From the above description, it can be seen that the above embodiments of the present disclosure achieve the following technical effects:

the branch-shaped light string and the light-emitting bonsai provided in Embodiments 1 and 2 of the present disclosure not only imitate the ornamental appearances of plants, but also provides a lighting function. When using the branch-shaped light string and the light-emitting bonsai disclosed in the present disclosure, the users can adjust the atmosphere of their environment through the lighting functions of the branch-shaped light string and the light-emitting bonsai, providing a comfortable and pleasant user experience.

The above descriptions are merely some embodiments of the present disclosure, but are not intended to limit the present disclosure. Those skilled in the art may make various modifications and variations to the present disclosure. Any modifications, equivalent replacements, improvements, etc. made within the spirit and principle of the present disclosure shall fall within the scope of protection of the present disclosure.

What is claimed is:

1. A branch-shaped light string, comprising:

a main branch extending in a preset direction;

at least one decorative branch arranged on the main branch and extending in a direction away from the main branch; and at least one light-emitting branch arranged on the main branch and extending in a direction away from the main branch, and/or the at least one light-emitting branch arranged on the at least one decorative branch and extending in a direction away from the at least one decorative branch;

wherein each of the at least one light-emitting branch comprises at least one light source, and each of the at least one light source is configured to be electrically connected with an external power source;

wherein each of the at least one light-emitting branch further comprises:

at least one light-transmitting member, a first hole channel being formed in and extending through each of the at least one light-transmitting member, and the at least one light source being arranged in each first hole channel.

2. The branch-shaped light string according to claim 1, wherein:

each of the at least one light-emitting branch further comprises:

at least one set of wires, each of the at least one set of wires at least comprising a positive wire and a negative wire, and the positive wire and the negative wire being threaded into two ends of the first hole channel, and being electrically connected with the at least one light source in the first hole channel.

3. The branch-shaped light string according to claim 2, wherein:

the at least one light-emitting branch further comprises:

a decorative coating, wrapping portions of each of the at least one set of wires exposed outside the light-transmitting member.

4. The branch-shaped light string according to claim 3, wherein:

the at least one light-transmitting member is made of a transparent or translucent material.

5. The branch-shaped light string according to claim 2, wherein:

the at least one light-transmitting member is made of a transparent or translucent material.

6. A light-emitting bonsai, comprising:

a branch-shaped light string, comprising:

a main branch extending in a preset direction;

at least one decorative branch arranged on the main branch and extending in a direction away from the main branch; and at least one light-emitting branch arranged on the main branch and extending in a direction away from the main branch, and/or the at least one light-emitting branch arranged on the decorative branch and extending in a direction away from the decorative branch;

wherein each of the at least one light-emitting branch comprises at least one light source, and each of the at least one light source is configured to be electrically connected with an external power source; and the light-emitting bonsai further comprising;

a container internally provided with an accommodation space and having an opening in one side;

an insertion core cylinder arranged in the accommodation space through the opening, and internally provided with an installation space; and a cover arranged at the opening to cover the accommodation space and the installation space, wherein an insertion hole is formed in the cover, the installation space communicates with an exterior of the container through the insertion hole, a limiting ring is sleeved onto the insertion hole, a second hole channel communicating with the installation space is formed in the limiting ring, and the main branch of the branch-shaped light string extends through the second hole channel and extends into the installation space.

7. The light-emitting bonsai according to claim 6, further comprising:

an integrated circuit board arranged in the installation space; and a battery arranged in the installation space and electrically connected with the integrated circuit board;

wherein a light source switch is arranged on a side portion of the container and is electrically connected with the battery through the integrated circuit board, and wires of the branch-shaped light string are electrically connected with the battery through the light source switch.

8. The light-emitting bonsai according to claim 7, wherein:

a charging interface is further formed in the cover and electrically connected with the battery through the integrated circuit board.

9. The light-emitting bonsai according to claim 6, wherein:

each of the at least one light-emitting branch further comprises:

at least one light-transmitting member, a first hole channel being formed in and extending through each of the at least one light-transmitting member, and the at least one light source being arranged in each first hole channel.

10. The light-emitting bonsai according to claim 9, wherein:

each of the at least one light-emitting branch further comprises:

at least one set of wires, each of the at least one set of wires at least comprising a positive wire and a negative wire, and the positive wire and the negative wire being threaded into two ends of the first hole channel, and being electrically connected with the at least one light source in the first hole channel.

11. The branch-shaped light string according to claim 10, wherein:

the at least one light-emitting branch further comprises:

a decorative coating, wrapping portions of each of the at least one set of wires exposed outside the light-transmitting member.

12. The branch-shaped light string according to claim 9, wherein:

the at least one light-transmitting member is made of a transparent or translucent material.

13. The branch-shaped light string according to claim 9, wherein:

the at least one light-transmitting member is made of a transparent or translucent material.

* * * * *